United States Patent

[11] 3,583,431

| [72] | Inventor | Robert M. Diel |
| | | Blackwell, Okla. |
| [21] | Appl. No. | 799,869 |
| [22] | Filed | Feb. 17, 1969 |
| [45] | Patented | June 8, 1971 |
| [73] | Assignee | The Cessna Aircraft Company |
| | | Wichita, Kans. |

[54] PRESSURE RELIEF VALVE
5 Claims, 6 Drawing Figs.

[52] U.S. Cl. .................................................. 137/474,
137/493, 137/508, 137/540
[51] Int. Cl. .................................................. F16k 17/26
[50] Field of Search ........................................... 137/469,
474, 508, 493, 540

[56] References Cited
UNITED STATES PATENTS

| 2,917,072 | 12/1959 | Saville | 137/469 |
| 3,036,593 | 5/1962 | Saville | 137/469 |
| 3,054,420 | 9/1962 | Williams | 137/508X |
| 3,370,601 | 2/1968 | Nevulis | 137/87 |

FOREIGN PATENTS

| 1,245,197 | 9/1960 | France | 137/469 |
| 633,005 | 12/1949 | Great Britain | 137/469 |

Primary Examiner—William F. O'Dea
Assistant Examiner—David J. Zobkiw
Attorneys—Gregory J. Nelson and Hubert E. Miller ABSTRACT: A relief valve with a poppet disposed therein for axial movement and normally spring-biased to a closed position and being actuated to an open pressure-relieving position by a predetermined pressure acting against the poppet face area. The effective poppet area exposed to high pressure enlarges in proportion to the spring rate as the poppet moves against the spring bias, so that the valve maintains constant pressure for different rates of fluid flow through the valve.

PATENTED JUN 8 1971

INVENTOR.
ROBERT M. DIEL

BY *Gregory J. Nilsson*

ATTORNEY

INVENTOR.
ROBERT M DIEL

PRESSURE RELIEF VALVE

This invention relates to valves and more particularly to an improved pressure relief valve having utility in diverting different rates of flow from a fluid chamber while regulating pressure of the chamber to a predetermined level.

Regulation of pressure in many fluid system applications requires a relief valve that not only limits but also maintains a predetermined pressure level in the high-pressure chamber. Further, it is necessary that the valve divert different rates of fluid from the fluid chamber to protect the system from overpressurization. For this purpose, a valve poppet, which is spring-biased onto a mating seat to seal the high-pressure chamber, is exposed to the chamber pressure to be hydraulically forced away from the seat to relieve fluid from the chamber and limit pressure therein. The farther the poppet travels away from the seat, the larger is the opening permitting a greater volume of fluid to escape.

Inherent to such spring biased, poppet type relief valves is the variable force of the spring closing means urging the valve poppet toward the seat. As the poppet opens, the spring compresses and exerts a greater closing force on the poppet. Consequently, to overcome the increasing closing force, prior art relief valves experienced a necessary increase in pressure acting on the poppet, as the poppet moved farther from its seat and flow increased through the relief valve. Accordingly, pressure substantially increased in the high-pressure chamber as flow through the relief valve increased.

The present invention contemplates a relief valve construction having a spring biased poppet with an effective poppet area exposed to pressure which enlarges as the poppet opens, thereby compensating for the spring gradient to create an increasing opening force from a constant hydraulic pressure.

Accordingly, it is an object of this invention to provide a relief valve with improved pressure flow characteristics.

Another object is to provide a relief valve which maintains a predetermined chamber pressure regardless of the amount of poppet valve opening.

A further object is to provide a relief valve in which the poppet opening force increases with poppet travel without attendant rise in pressure in the high-pressure chamber.

A more specific object is to provide a relief valve construction in which the effective poppet area exposed to pressure gradually increases in proportion to the increasing force of the biasing means as the valve opens.

Another object is to provide a relief valve with an annular ring-shaped portion of the poppet exposed to high pressure which provides a more compact valve construction.

Furthermore, an object of this invention is to provide a relief valve characterized by the foregoing objectives which acts as a combination pressure relief and reverse flow check valve.

Yet another object is to provide an improved high-pressure relief valve of compact construction wherein a force transmitting means disposed through the center of the poppet reduces the pressure force on the poppet and reduces the necessary spring bias of the valve.

Other objects and features of the invention will become apparent from the following description and accompanying drawings in which.

Briefly, the invention comprises a relief valve having a poppet member spring-biased into sealing engagement with a seat. A portion of the face of the poppet is exposed to system pressure of a high-pressure chamber, a predetermined pressure therein tending to open the poppet and urge it away from the seat to provide a fluid passage for fluid flow out of the chamber to limit pressure therein. As the valve poppet opens, the area of the poppet face exposed to high pressure increases at a predetermined rate, so that constant pressure produces an increasing poppet opening force to counteract the increasing poppet closing force resulting from the increasing spring rate of the biasing spring. Accordingly, the valve limits pressure in the chamber to the predetermined value regardless of the rate of flow being diverted from the chamber across the poppet.

Figure 1:
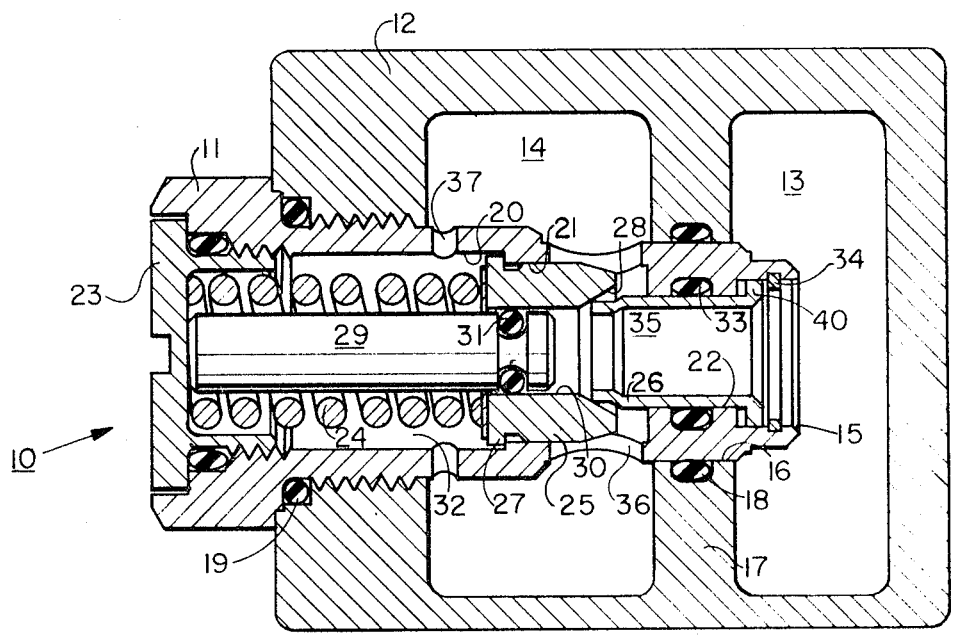
FIG. 1 is a longitudinal section of one embodiment of the improved relief valve.

Turning now to the drawings, FIG. 1 shows a cartridge type relief valve assembly 10 having an outer body 11 in threaded engagement with a fluid pressure housing 12 having high-pressure inlet chamber 13 and low-pressure fluid discharge return chamber 14 separated by wall 17. Such a pressure relief valve has many varied applications. For instance, housing 12 may represent a pressure fluid pump, motor, control valve or similar vessel in which chamber 13 carries pressurized fluid flow that is directed to perform useful work. Body 11 extends into high-pressure chamber 13 through hole 16 of wall 17. Appropriate sealing members 18 and 19 prevent fluid leakage between chambers 13 and 14 and the exterior of vessel 12.

Body 11 defines an interior axial bore 20 with reduced diametral sections 21 and 22. An externally adjustable end cap 23 closes one end of body 11 to seal bore 20 from the exterior, while section 22 is in communication with high-pressure chamber 13 through end opening 15. Positioned within bore 20 are compression helical coil spring 24, movable poppet 25 and cylindrically shaped seat 26. Spring 24 extends axially between the end cap 23 and poppet 25 and urges poppet 25 rightwardly to a closed position where its shoulder 27 contacts a mating portion of body 11, and its valve portion, conical face 28, engages the annular terminal edge of circular seat 26. Poppet 25 is guided longitudinally within reduced diametral portion 21 of body 11. Disposed within coil spring 24 is dowel pin 29 having one end projecting inwardly into central through bore 30 of poppet 25 and the opposite end abutting cap 23. A sealing member 31 situated within bore 30 in a groove in pin 29 seals bore 30 from fluid chamber 32 formed by the body 11, cap 23, poppet 25 and pin 29.

Seat 26 fits within reduced diametral portion 22 of the body and leakage fluid flow around the exterior of seat 26 is prevented by O-ring seal 33. Snap ring 34 attached to body 11 near open end 15 constrains seat 26 within the body. Central passage 35 in seat 26 provides unobstructed fluid communication between high-pressure chamber 13 and central bore 30 of poppet 25. The pressure existing in chamber 13 produces an end thrust through dowel 29 against cap 23, and a force on poppet 25 opposing the force of spring 24. Fluid pressure from chamber 13 acts upon the annular inner area of poppet conical face 28 inwardly from its circle of contact with the terminal edge of seat 26, as will be more fully explained hereafter.

The annular area of face 28 outwardly from the circle of contact with the terminal edge of seat 26, is subject to the low pressure of chamber 14 through fluid discharge passages 36 in body 11. Chamber 32 communicates with low-pressure chamber 14 through drilled cross passages 37 extending through body 11.

If desired, seat 26 may be permanently attached to, or made integral with housing 11, in which case sealing member 33 can be deleted from the construction. However, to facilitate economical production and reduce leakage through the valve, seat 26 is formed as a part separate from body 11. The extreme leftward end of seat 26 exposed to the low pressure of chamber 14 is crimped to a reduced diameter to provide an area differential on seat 26, so that the high pressure existing in chamber 13 positively biases seat 26 leftwardly against poppet 25. Thus, during initial compression of spring 24 and leftward movement of poppet 25, seat 26 will also move a limited axial distance with the poppet until flanged end 40 contacts the cooperating shoulder on body 11. While seat 26 is moving axially, firm contact is maintained between the seat and poppet by pressure in chamber 13, thereby positively preventing leakage through valve 10 when chamber 13 pressure is not excessive. Excessive pressure in chamber 13 urges poppet 25 further leftwardly to separate poppet face 28 from seat 26 and open the valve to relieve pressure. Axial travel of seat 26 within bore 22 is limited, but is sufficient to compensate for manufacturing tolerances of the various elements of valve 10 to assure that seat 26 firmly contacts poppet 25 in the closed position.

Alternatively, positive contact between the poppet and seat may be obtained by eliminating shoulder 27 of poppet 25 so that spring 24 will always urge the poppet and seat into contact. The rightward spring thrust will then be absorbed through snap ring 34.

Figure 2:
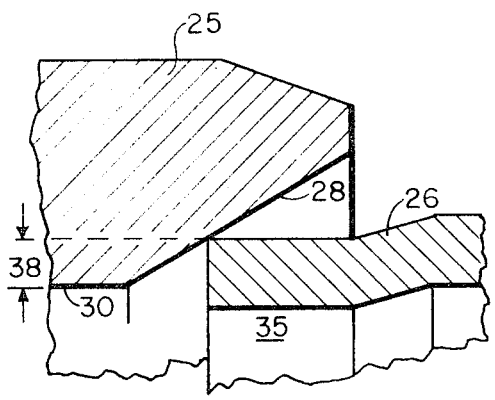
FIG. 2 is a detail view of the mating poppet and seat of FIG. 1 in a closed position.
Figure 3:
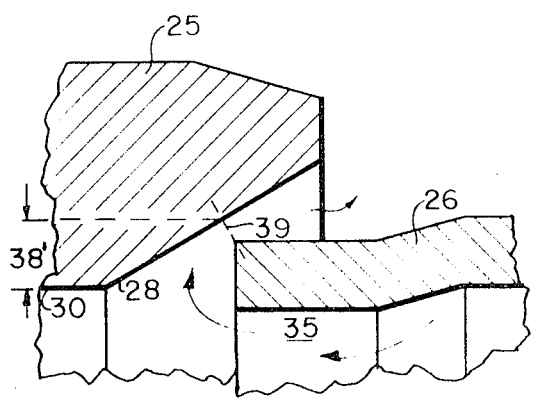
FIG. 3 is a view similar to FIG. 2 with the poppet in an open flow-diverting position.

The cooperation of the poppet and seat to valve pressure fluid is more clearly illustrated in FIGS. 2 and 3. As shown in FIG. 2 with the poppet in a closed position, high-pressure fluid acts on an annular or frustoconical ring area 38 of poppet 25 of which the inner diameter is defined by bore 30 and outer diameter defined by the circular line of contact between seat and poppet. When chamber 13 pressure reaches a predetermined value, pressure on the annular ring area 38 exerts the necessary opening force to overcome and compress spring 24 and move poppet 25 away from seat 26 to a position as in FIG. 3, where fluid may escape from chamber 13 through bore 35 and low-pressure chamber 14. Spring 24 exerts an increasing rightward closing thrust on poppet 25 as the poppet moves leftwardly compressing the spring. Poppet 25 travels a sufficient distance to create a sufficiently large opening between the poppet and seat to divert the required flow out of chamber 13 and limit pressure therein to the predetermined level. As pressure falls in chamber 13, spring 24 overcomes the pressure opening force to reseat the poppet onto seat 26.

To provide an opening force increasing with poppet opening travel without attendant increases in pressure, this invention contemplates a gradual increase in poppet area exposed to high pressure as the poppet opens. Referring to FIG. 3, as fluid flows through the orificing restriction between poppet 25 and seat 26, high pressure from chamber 13 is effectively maintained up to the narrowest opening between the poppet and seat, where pressure then drops to the pressure of chamber 14. As illustrated by broken line 39, the narrowest restriction occurs on a perpendicular from conical surface 28 to the outside corner of seat 26. The inner area of conical face 28 bounded by line 39 is at high pressure so that the annular ring area 38' subject to opening pressure has gradually increased from area 38 of FIG. 2.

As clearly shown in FIGS. 2 and 3, the area 38 subject to opening pressure is determined by the location of face 28 relative to the terminal edge of seat 26. Once poppet 25 moves away from the seat, the effective location of the terminal edge of the seat in FIG. 3 is determined by projection line 39 at the narrowest opening between poppet and seat.

The straight conical face 28 has been found to function adequately with a spring having approximately a linear spring gradient or rate such as helical coil spring 24. With a nonlinear spring it may be desirable to have a concave or convex face rather than the straight conical design shown. The acute angle at which the conical face intercepts the longitudinal axis of bore 30, as well as the size of bore 30 itself, can be varied to provide the desired pressure flow characteristics. Variation of these last two mentioned factors affect the increase in face area subject to pressure for a given distance of poppet opening travel. Also, the Bernoulli forces acting on poppet 25 are a function of the face acute angle.

With proper consideration of the spring rate of spring 24 and other factors (e.g., fluid velocity pressure head, Bernoulli forces) affecting the change in poppet closing force, poppet face 28 is properly designed to provide the necessary proportional increase in area 38, whereby a constant opening pressure produces a proportional increasing opening force to offset the increasing closing force. As fluid flow from chamber 13 to poppet face 28 is unobstructed and unrestricted, the chamber pressure will be equal to the constant opening pressure over a wide range of flows. The terms "spring rate" and "spring gradient" as used throughout the specification and claims are synonomous and describe the relationship between spring compression and force.

Further, the preferred construction shown in FIG. 1 also permits reverse flow through the valve under cavitation conditions to prevent fluid starvation in the high pressure or inlet side. Such a cavitation condition can arise when the relief valve is interposed in a control valve operating, for example, a cylinder connected to the boom of a backhoe and the boom is suddenly lowered causing a void in the cylinder. As discussed above, seat 26 is permitted slight bidirectional axial movement or "float" between snap ring stop 34 at the right and poppet 25 when the poppet is in the closed position. The left end of seat 26 is crimped to a reduced diameter providing an area differential, which, under normal conditions with high-pressure existing chamber 13, will result in the seat being positively urged toward the poppet until axial movement of the poppet is arrested when flange 40 engages the shoulder in the housing adjacent the inlet. Farther axial movement of the poppet will result in opening of the valve to relieve pressure from chamber 13.

However, should the pressure in chamber 13 fall below that in chamber 14, the seat is free to move without restriction to the right in response to the reverse pressure differential imposed across the valve. The higher pressure now existing on the outlet side will act against the exterior of the seat at the shoulder formed at the reduced diameter to bias the seat rightward into engagement with the snap ring 34. This permits reverse flow into the high-pressure chamber 13 from the outlet chamber preventing cavitation. Once the normal high pressure is restored in chamber 13, the seat will be biased against the poppet.

Another advantageous feature of valve 10 in FIG. 1 is its compact construction. The central through bore 30 of poppet 25 provides a ring-shaped area subject to high pressure and reduces the hydraulic opening forces acting on the poppet. Thus, a smaller, shorter spring 24 exerting less force can be used in the valve. Dowel pin 29 extends into bore 30 to seal chamber 13 from low pressure valve chamber 32, and the thrust of pressure acting on pin 29 is transferred to and absorbed by cap 23 rather than by poppet 25. In this smaller relief valve, on the other hand, the valve flow capacity is not reduced, as a large opening can still be effected because of the large radius maintained on circular seat 26 to handle large flow volumes. Consequently, while maintaining a relatively large poppet and seat to handle large fluid volumes, the improved valve has a relatively small spring 24 providing a more compact construction.

FIGURE 4 EMBODIMENT

Figure 4:
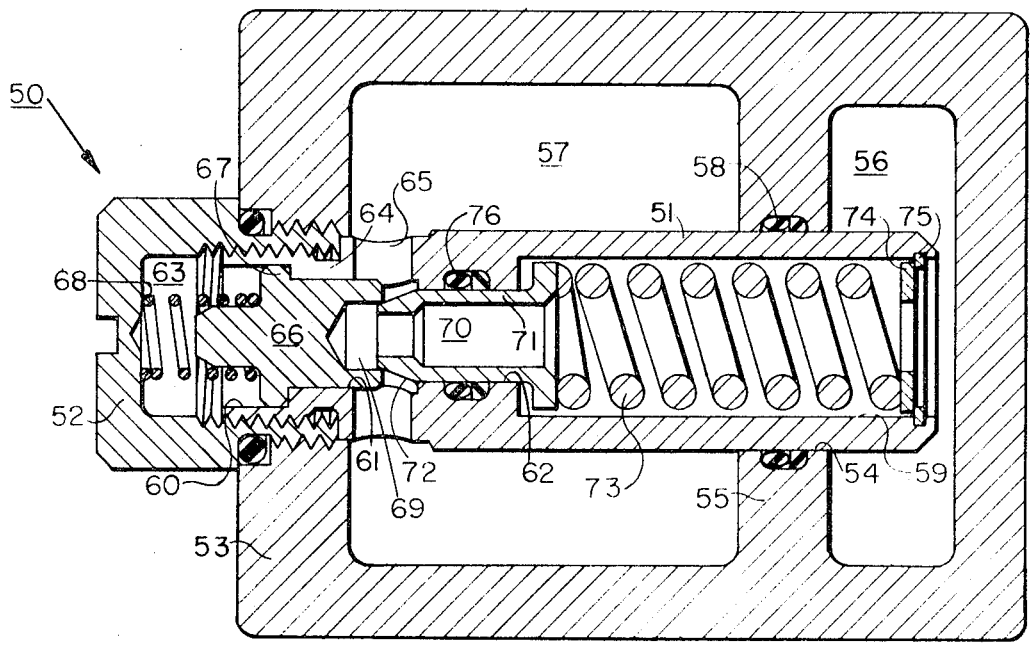
FIG. 4 is a longitudinal section of another embodiment of the invention.

Another preferred embodiment of the invention is shown in FIG. 4, wherein the seat is movable and also serves to prevent cavitation in the high-pressure chamber. Relief valve assembly 50 has a cylindrical body 51 threadably inserted in hollowed end cap 52 which is securely attached to a wall of a fluid container 53. Cylinder 51 protrudes through bore 54 in barrier 55 into a low-pressure chamber 56 that is sealed from high-pressure chamber 57 by sealing member 58. Axial bore 59 in cylinder 51 opens into return chamber 56 and has concentric, sequentially reduced diametral sections 60, 61 and 62. Fluid chamber 63 of hollowed cap 52 communicates with chamber 57 through slot opening 64 and cross bores 65 in cylinder 51.

Reciprocable within reduced diametral section 61 is movable seat 66 having a shoulder 67 guided within reduced diameter 60. The seat is urged rightwardly against the shoulder between sections 60 and 61 in cylinder 51 by helical spring 68 and fluid pressure in chamber 63. Blind bore 69 in the right face of seat 66 communicates with bore 59 and chamber 56 through central passage 70 in sleeve poppet 71 which is guided within the smallest diameter section 62 of cylinder 51. The valve portion of poppet 71, its chamfered face 72, is urged onto the terminal edge of seat bore 69 by compression spring 73 whose rightward thrust is absorbed by cylinder 51 through washer 74 and snap ring 75.

Seal 76 prevents fluid leakage between chambers 56 and 57 through section 62 so that the circle of contact between face 72 and seat 66 solely controls fluid flow between chambers 56 and 57. Thus, a predetermined pressure from chamber 57 acting on the outer area of chamfered face 72, which unobstructively communicates with chamber 57 through inlet cross-holes 65, will overcome the bias of spring 73 to move poppet 71 rightwardly and create a restricted fluid opening between the poppet and seat. Fluid is then diverted from chamber 57 through cross-holes 65 and the poppet opening, into bores 69, 70 and 59 to fluid return chamber 56, the travel of poppet 71 again being enough to divert sufficient flow from chamber 57 to control pressure to the predetermined limit.

Figure 5:
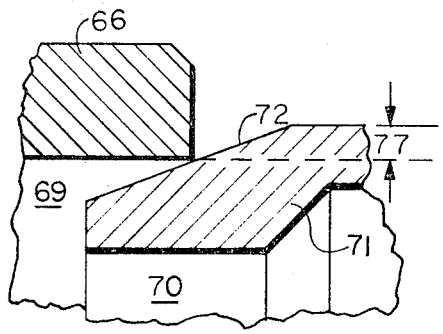
FIG. 5 is a detail view of the mating poppet and seat of FIG. 4 in a closed position.

As shown in Figure 5, the annular ring area 77 of poppet face 72 subject to pressure of chamber 57 when the poppet is in a closed position, extends from the outer periphery of poppet 71 to the circle of contact between poppet 71 and seat 66. The remaining area of face 72 extending radially inwardly from the poppet and seat contact is at low pressure as bores 69 and 70 are communicating with fluid return chamber 56. As described with respect to the FIG. 1 embodiment, such a ring area exposed to high pressure produces a compact valve design of unusually high flow capacity.

Figure 6:
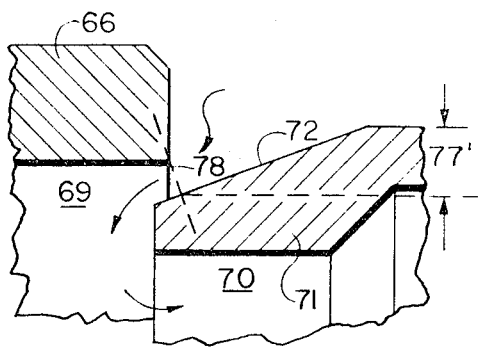
FIG. 6 is a view similar to FIG. 5 with the poppet in an open flow-diverting position.

In Figure 6, with poppet 71 moved to an open position, pressure of the fluid flowing past the poppet into bore 69 drops at the narrowest restriction between poppet and seat, which is shown by broken line 78 extending perpendicularly to face 72 to the terminal edge of seat bore 69. Thus, in this open position, the effective location of the terminal edge of bore 69 has changed to reduce the inner radius of the ring area 77' and consequently, expose a greater area of poppet 71 to high pressure. The predetermined pressure acting on the gradually increasing ring area 77' of poppet 71 provides an increasing opening force to counteract the increasing closing force generated by compression of spring 73 when the poppet opens. Accordingly, regardless of poppet position and the volume of fluid passing through the valve, pressure in chamber 57 is limited to the predetermined level.

As described with respect to the FIG. 1 embodiment, the change in poppet face area 77 subject to chamber 57 pressure is balanced against the increasing poppet closing force. If desired, the increasing pressurized poppet area 77 may work together with another increasing opening force acting on the poppet to balance the increasing closing force. For instance, an orifice in the central poppet passage 70, downstream from the opening between poppet and seat, will produce a pressure drop that increases with flow through the valve and accordingly, increases with poppet opening travel. The resulting pressure at the left end of poppet 71 will be higher than pressure in spring carrying bore 59, and a hydraulic force increasing with flow through the valve and with poppet opening travel will assist in urging poppet 71 rightwardly. Thus, such an increasing hydraulic force may be utilized in conjunction with the increasing poppet area 77 whereby a predetermined pressure in chamber 57 creates the increasing opening force on the poppet to balance the increasing closing force. With the assistance of the downstream orifice, less increase in pressurized poppet area is required.

Referring again to FIG. 4, movable seat 66 functions as an anticavitation valve to prevent fluid starvation within chamber 57. In many applications a high-pressure fluid chamber as 57 may, at times, drop to an exceedingly low pressure and cavitate. The maintenance of a low pressure in chamber 56 will prevent such dangerous occurrence which is capable of destroying the pressure fluid container. Near cavitation of chamber 57, pressure in chamber 63 of cap 52 also reduces, so that the low pressure in chamber 56 acts on seat 66 within its blind bore 69 to overcome the slight bias of light spring 68 and move seat 66 leftwardly away from poppet 71. Reverse fluid flow then passes from chamber 69 through cross-holes 65 into chamber 57 to maintain it full and at low pressure to prevent cavitation.

The foregoing description of the preferred embodiments of the invention are to be considered exemplary only and not as limiting to the scope and spirit of the invention as set forth in the appended claims.

Having described my invention with sufficient clarity so that those skilled in the art may construct and use it,

I claim:

1. A fluid pressure relief valve comprising:
    a. a body having a central passage therein and being open at one end to form an outlet and closed at the other end, said body including an inwardly extending protuberant portion positioned intermediate said ends having a first and second shoulder at opposite ends and having an inlet opening into said central passage in the area of said protuberant section;
    b. a movable poppet positioned in said central passage and having a central bore providing hydraulic communication from inlet to outlet, said poppet having a flanged end cooperating with said first shoulder to limit axial travel, and a converging valve portion;
    c. a seat in said central passage having a flanged portion engageable with said second shoulder of said body and defining an end chamber extending between the closed end and said seat and being in communication with said inlet, said seat having an annular terminal edge engaging said converging valve portion in a poppet closed position to block fluid flow between said inlet and outlet and providing selective communication therebetween in an open position, the effective location of said terminal edge to said valve portion defining an outlet area of the valve portion within the seat exposed to outlet pressure and an inlet area outside said seat adjacent said inlet exposed to inlet pressure;
    d. valve closing means including a resilient biasing member engaging said poppet and urging said poppet to the closed position, the closing force exerted by said valve closing means increasing as the poppet opens and travels away from said seat to place the fluid inlet and outlet in communication through the opening formed between said valve portion and said seat; and
    e. said valve portion having a surface configuration cooperating with said seat whereby a predetermined inlet pressure acting on said inlet area moves said poppet away from said seat whereupon said inlet area enlarges and said predetermined inlet pressure produces a force on said poppet opposing and proportional to said increasing closing force exerted as said poppet opens 2. The valve of claim 1 wherein said valve portion surface configuration is frustoconical and tapers inwardly toward said body closed end, and said resilient biasing member comprises a linear gradient spring.

3. The valve of claim 1 wherein said seat is movably disposed in said housing and additionally includes biasing means acting in said end chamber urging said seat into engagement with said second shoulder and toward said poppet.

4. The valve of claim 3 wherein said seat biasing means includes a spring in said end chamber extending between said closed end and said movable seat whereby a predetermined drop in pressure in the inlet chamber below the pressure in the outlet chamber will allow the force acting against the seat to cause the seat to retract from said poppet causing a reverse flow of fluid from discharge to inlet to prevent cavitation in the chamber associated with the inlet.

5. In a relief valve having a body with an inlet and outlet and a communicating passage extending therebetween, a poppet slidably mounted in said passage having a frustoconical face and an outwardly extending flange, first stop means in said body adapted to engage said poppet flange, biasing means engaging said poppet and urging said poppet in a first axial direction to a closed position into engagement with said first stop means, cylindrical seat means in said passage adjacent said poppet, said seat means engageable with said frustoconical face to form a seal permitting selective communication between said inlet and outlet whereby a portion of said face is exposed to pressure in the inlet and a portion of said face is exposed to pressure in the outlet, wherein the improvement comprises:

flange means extending outwardly from said seat means;

second stop means in said body arranged adjacent said inlet and cooperating with said seat flange means to permit limited bidirectional axial movement of said seat means when said poppet is in said closed position;

said seat means having a first differential area exposed to inlet pressure and a second differential area exposed to outlet pressure, whereby the normally higher pressure existing within the inlet urges the seat means toward the poppet in a second axial direction and a predetermined pressure rise in said inlet acts to increase the force on the poppet frustoconical face and seat means urging the poppet and seat means in said second axial direction and to effect separation upon further movement of said poppet after movement of said seat means is arrested by said second stop means; and whereby a predetermined decrease in pressure in said inlet will permit the outlet pressure acting on said second differential area to move said seat means in a first axial direction away from said poppet thereby permitting reverse flow from said outlet to said inlet through said valve.